United States Patent [19]
Christie et al.

[11] Patent Number: 6,151,662
[45] Date of Patent: *Nov. 21, 2000

[54] DATA TRANSACTION TYPING FOR IMPROVED CACHING AND PREFETCHING CHARACTERISTICS

[75] Inventors: David S. Christie, Austin; Brian D. McMinn, Buda, both of Tex.; Stephan G. Meier, Mountain View, Calif.; James K. Pickett, Austin, Tex.

[73] Assignee: Advanced Micro Devices, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/982,720

[22] Filed: Dec. 2, 1997

[51] Int. Cl.⁷ .................................................. G06F 12/12
[52] U.S. Cl. ........................ 711/145; 711/138; 711/134; 711/137; 711/213
[58] Field of Search .................................... 711/118, 132, 711/133, 134, 138, 139, 141, 145, 137, 213

[56] References Cited

U.S. PATENT DOCUMENTS

| | | | |
|---|---|---|---|
| 4,928,239 | 5/1990 | Baum et al. ............................. | 711/136 |
| 5,371,865 | 12/1994 | Aikawa et al. ......................... | 711/125 |
| 5,652,858 | 7/1997 | Okada et al. ............................ | 711/137 |
| 5,745,728 | 4/1998 | Genduse et al. ........................ | 711/126 |
| 5,822,757 | 10/1998 | Chi .......................................... | 711/129 |
| 6,009,512 | 12/1999 | Christie ................................... | 712/226 |

OTHER PUBLICATIONS

Chi et al., "Reducing Data Access Penalty Using Intelligent Opcode–Driven Cache Prefetching," 1995, IEEE, p 512–517.

IBM Technical Disclosure Bulletin, "Methods of Specifying Data Prefetching without using a Separate Instruction", vol. 38 No. 6, Jun. 1995, p 355–356.

"*Programming the 80386*" by John H. Crawford and Patrick P. Gelsinger, 1987 SYBEK Inc, Alameda, CA, pp. 55.

*Primary Examiner*—Kevin L. Ellis
*Attorney, Agent, or Firm*—Conley, Rose & Tayon, PC; Lawrence J. Merkel

[57] ABSTRACT

A microprocessor assigns a data transaction type to each instruction. The data transaction type is based upon the encoding of the instruction, and indicates an access mode for memory operations corresponding to the instruction. The access mode may, for example, specify caching and prefetching characteristics for the memory operation. The access mode for each data transaction type is selected to enhance the speed of access by the microprocessor to the data, or to enhance the overall cache and prefetching efficiency of the microprocessor by inhibiting caching and/or prefetching for those memory operations. Instead of relying on data memory access patterns and overall program behavior to determine caching and prefetching operations, these operations are determined on an instruction-by-instruction basis. Additionally, the data transaction types assigned to different instruction encodings may be revealed to program developers. Program developers may use the instruction encodings (and instruction encodings which are assigned to a nil data transaction type causing a default access mode) to optimize use of processor resources during program execution.

28 Claims, 5 Drawing Sheets

DATA TRANSACTION TYPING FOR IMPROVED CACHING AND PREFETCHING CHARACTERISTICS

BACKGROUND OF THE INVENTION

1. Field of the Invention

This invention is related to the field of microprocessors and, more particularly, to caching and prefetching mechanisms within microprocessors.

2. Description of the Related Art

Superscalar microprocessors achieve high performance by executing multiple instructions per clock cycle and by choosing the shortest possible clock cycle consistent with the design. On the other hand, superpipelined microprocessor designs divide instruction execution into a large number of subtasks which can be performed quickly, and assign pipeline stages to each subtask. By overlapping the execution of many instructions within the pipeline, superpipelined microprocessors attempt to achieve high performance.

Superscalar microprocessors demand low memory latency due to the number of instructions attempting concurrent execution and due to the increasing clock frequency (i.e. shortening clock cycle) employed by the superscalar microprocessors. Many of the instructions include memory operations to fetch (read) and update (write) memory operands. The memory operands must be fetched from or conveyed to memory, and each instruction must originally be fetched from memory as well. Similarly, superpipelined microprocessors demand low memory latency because of the high clock frequency employed by these microprocessors and the attempt to begin execution of a new instruction each clock cycle. It is noted that a given microprocessor design may employ both superscalar and superpipelined techniques in an attempt to achieve the highest possible performance characteristics.

Microprocessors are often configured into computer systems which have a relatively large, relatively slow main memory. Typically, multiple dynamic random access memory (DRAM) modules comprise the main memory system. The large main memory provides storage for a large number of instructions and/or a large amount of data for use by the microprocessor, providing faster access to the instructions and/or data than may be achieved from a disk storage, for example. However, the access times of modern DRAMs are significantly longer than the clock cycle length of modern microprocessors. The memory access time for each set of bytes being transferred to the microprocessor is therefore long. Accordingly, the main memory system is not a high bandwidth, low latency system. Microprocessor performance may suffer due to the high memory latency.

In order to allow low latency memory access (thereby increasing the instruction execution efficiency and ultimately microprocessor performance), computer systems typically employ one or more caches to store the most recently accessed data and instructions. Additionally, the microprocessor may employ caches internally. A relatively small number of clock cycles may be required to access data stored in a cache, as opposed to a relatively larger number of clock cycles required to access the main memory.

Low effective memory latency may be achieved in a computer system if the cache hit rates of the caches employed therein are high. An access is a hit in a cache if the requested data is present within the cache when the access is attempted. On the other hand, an access is a miss in a cache if the requested data is absent from the cache when the access is attempted. Cache hits are provided to the microprocessor in a small number of clock cycles, allowing subsequent accesses to occur more quickly as well and thereby decreasing the memory latency. Cache misses require the access to receive data from the main memory, thereby increasing the memory latency.

In order to increase cache hit rates, computer systems may employ prefetching to "guess" which data will be requested by the microprocessor in the future. The term prefetch, as used herein, refers to transferring data (e.g. a cache line) into a cache prior to a request for the data being generated via instruction execution. A "cache line" is a contiguous block of data which is the smallest unit for which a cache allocates and deallocates storage. If the prefetched data is later accessed by the microprocessor, then the cache hit rate may be increased due to transferring the prefetched data into the cache before the data is requested.

Unfortunately, prefetch algorithms employed by microprocessors are generally very simple algorithms which observe the pattern of memory accesses during execution of a program and attempt to prefetch addresses during that execution based on the observed pattern. For example, stride-based prefetch algorithms have been employed in which the difference between consecutive memory accesses (the "stride") is calculated and used to generate prefetch addresses. These simple prefetch algorithms may not handle a large portion of the memory access patterns which may be exhibited by programs. Particularly, data memory access patterns may not be handled well by simple prefetch algorithms. Generally, only data memory access patterns having a highly regular pattern which can be characterized by one or a small number of values (e.g. strides) are prefetched accurately, and other patterns exhibit varying degrees of prefetch inaccuracy. Inaccurate prefetching consumes memory bandwidth which may be needed by the other memory operations, and may increase cache miss rates by dislodging data from the cache which may later be accessed in response to the program to store data which may not later be accessed in response to the program. Still further, a given microprocessor typically employs only one prefetch algorithm. Since no one prefetch algorithm is optimal for all data memory access patterns, some data memory access patterns may fair poorly under the selected prefetch algorithm.

It is therefore desirable to tailor data caching and data prefetching to the program being executed in order to maximize cache efficiency (e.g. increase hit rates) and prefetch efficiency (e.g. increase prefetch accuracy).

SUMMARY OF THE INVENTION

The problems outlined above are in large part solved by a microprocessor in accordance with the present invention. The microprocessor assigns a data transaction type to each instruction. The data transaction type is based upon the encoding of the instruction, and indicates an access mode for memory operations corresponding to the instruction. The access mode may, for example, specify caching and prefetching characteristics for the memory operation. The access mode for each data transaction type is selected to enhance the speed of access by the microprocessor to the data, or to enhance the overall cache and prefetching efficiency of the microprocessor by inhibiting caching and/or prefetching for those memory operations. Advantageously, the instruction encoding is used to determine caching and prefetching characteristics. Instead of relying on data memory access patterns and overall program behavior to determine caching and prefetching operations, these operations are determined on an instruction-by-instruction basis. Cache and prefetch efficiency may be increased, and hence overall microprocessor performance may be increased as well.

Additionally, the data transaction types assigned to different instruction encodings may be revealed to program developers and compiler developers. Program developers may use the instruction encodings (and instruction encodings which are assigned to a nil data transaction type causing a default access mode) to optimize use of processor resources during program execution. Similarly, compilers may be designed to select appropriate instruction encodings based upon the type of data being manipulated by each instruction. Even more performance may be gained through the judicious choice of instruction encodings.

Broadly speaking, the present invention contemplates a microprocessor comprising a decode unit and a load/store unit. The decode unit is coupled to receive an instruction and configured to determine a data transaction type corresponding to the instruction. Coupled to receive the data transaction type if the instruction includes a memory operation, the load/store unit is configured to determine an access mode for the memory operation in response to the data transaction type.

The present invention further contemplates a method for categorizing a memory operation. An instruction is decoded to determine a data transaction type corresponding to the instruction. Data corresponding to the instruction is accessed using an access mode responsive to the data transaction type.

BRIEF DESCRIPTION OF THE DRAWINGS

Other objects and advantages of the invention will become apparent upon reading the following detailed description and upon reference to the accompanying drawings in which.

Figure 1:
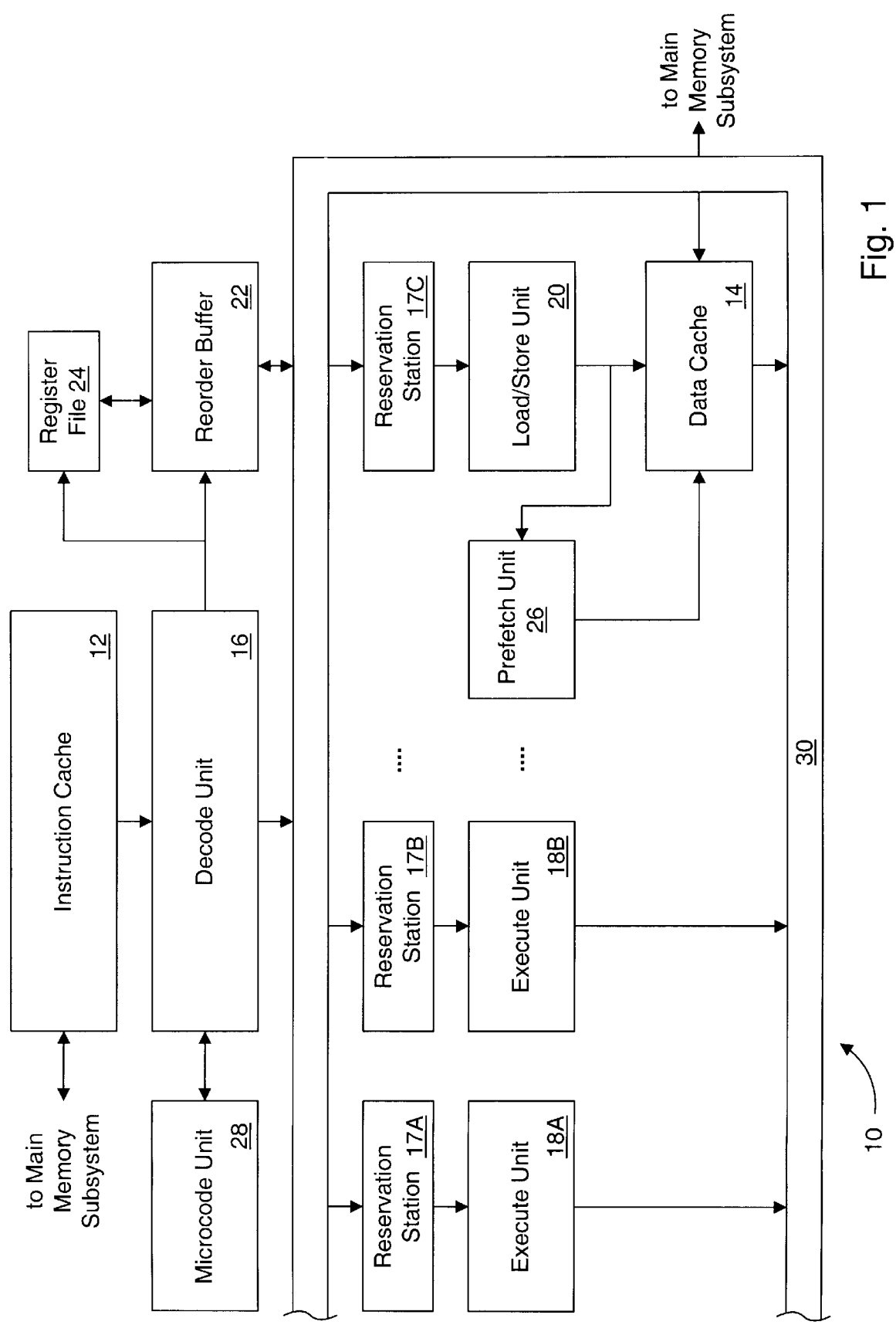
FIG. 1 is a block diagram of one embodiment of a microprocessor including a decode unit, a load/store unit, a data cache, and a prefetch unit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Other embodiments are possible and contemplated. As shown in FIG. 1, microprocessor 10 includes an instruction cache 12, a data cache 14, a decode unit 16, a plurality of reservation stations including reservation stations 17A, 17B, and 17C, a plurality of execute units including execute units 18A and 18B, a load/store unit 20, a reorder buffer 22, a register file 24, a prefetch unit 26, and a microcode unit 28. Elements referred to herein with a particular reference number followed by a letter will be collectively referred to by the reference number alone. For example, the plurality of execute units will be collectively referred to herein as execute units 18. Execute units 18 may include more execute units than execute units 18A and 18B shown in FIG. 1. Additionally, an embodiment of microprocessor 10 may include one execute unit 18.

As shown in FIG. 1, instruction cache 12 is coupled to a main memory subsystem (not shown) and to a decode unit 16, which is further coupled to reservation stations 17, reorder buffer 22, register file 24, and microcode unit 28. Reorder buffer 22, execute units 18, and data cache 14 are each coupled to a result bus 30 for forwarding of execution results. Furthermore, each reservation station 17A and 17B is coupled to a respective execute unit 18A and 18B, while reservation station 17C is coupled to load/store unit 20. Each reservation station 17 is coupled to receive operand information from reorder buffer 22. Load/store unit 20 is coupled to data cache 14, which is further coupled to the main memory subsystem. Additionally, prefetch unit 26 is coupled to load/store unit 20 and data cache 14.

Generally speaking, decode unit 16 is configured to decode instructions from instruction cache 16 for dispatch to reservation stations 17A–17C. Additionally, decode unit 16 is configured to generate a data transaction type for each instruction. The data transaction type identifies the type of data being accessed by the instruction, based upon the encoding of the instruction. Different types of data may benefit from different caching characteristics and different prefetching characteristics. By identifying the data types which can be determined from the instruction encoding, an access mode for the data accessed by the instruction can be determined. The access mode may define caching characteristics for the data, as well as prefetching characteristics. The caching and prefetching characteristics may be selected to enhance microprocessor 10's access speed to the data, or may be selected to minimize data cache efficiency impact of data types not likely to be reused. Advantageously, overall data cache and prefetch efficiency may be enhanced by determining appropriate caching and prefetch characteristics for data on an instruction by instruction basis.

Generally, the address operands employed by an instruction may give clues to the type of data being accessed by the instruction. For example, a stack pointer register may be defined to indicate the top of a stack in memory. A stack is a last in, first out (LIFO) data structure in which items to be stored are pushed onto the top of the stack and items to be removed are popped from the top of the stack. Stacks are often used to store register spill data (i.e. as a temporary storage for the register values while the registers are used for other purposes). Often, the data will be accessed again (to read the values back into the registers). Therefore, store memory operations having a stack frame data transaction type may be considered high priority for caching. However, since the data is sourced from registers and is allocating space within the stack, it is less likely that prefetching may be of benefit. Therefore, prefetching using the address of the instruction may be inhibited if the stack frame data transaction type is determined for the instruction. A stack frame data transaction type may be generated if the stack pointer register is used as an address operand.

In one embodiment, stack operations may include push-type operations in which the stack is increased by one or more storage locations (in which data specified by the push-type operations or subsequent operations is to be stored). Push-type operations may be performed using a write-allocate caching policy. Furthermore, instead of fetching a cache miss for push-type operations from memory and updating the fetched data, microprocessor 10 may allocate a cache line and store the data provided by the push-type operations into the cache. Other data within the cache line may be marked as invalid for read, or software may be coded to not use the other data within the cache line until it is written with valid data via an instruction. Similarly, stack operations may include pop-type operations in which data is read from the stack and the stack is decreased by one or more storage locations. When pop-type operations are performed, microprocessor 10 may clear the modified status of a cache line including the pop-type operation (if the entire cache line has been popped from the stack). Alternatively, the cache line may be invalidated if the entired cache line has been popped from the stack. In this manner, data from the cache line is not written back to memory. Since the program has already logically discarded the data, writing the data back to memory may be unnecessary.

Another data type for which a write allocate (without fetching the data from memory first) policy may be beneficial is dynamically allocated memory. Dynamically allocated memory is memory which is requested by an application program during operation of the program. The operating system may allocate memory in response to a dynamic memory allocation request. The program generally stores data into the dynamically allocated memory prior to using the data. Accordingly, a write allocate without fetching policy may be useful since the data in the dynamically allocated memory locations is undefined to the requesting program. In other words, a properly executing program does not attempt to read the dynamically allocated memory until the program updates the dynamically allocated memory with data Yet another data transaction type which may be employed is an array data transaction type. Array accesses are typically characterized by multiple access to memory locations, wherein each of the memory locations is separated from a subsequent memory location by a fixed distance (i.e. number of bytes). For example, a particular row or column of a two dimensional array may be traversed searching for a value or operating upon each value within the row or column. Array accesses may be repeated, or nearby elements may subsequently be accessed, so caching data corresponding to the array data transaction type may be desirable. Additionally, prefetching may be desirable. Either a streaming prefetch (in which consecutive cache lines in memory are prefetched) or a stride-based prefetch may be suitable. The array data transaction type may be detected by detecting a base plus index addressing mode, for example. The base address may be the memory location of the first element in the array, and the index may be a value identifying the particular element being accessed.

Yet another example of a data transaction type may be the pointer data transaction type. The pointer data transaction type is characterized by the accessed data being used as an address for a subsequent memory operation. Therefore, caching may be undesirable while prefetching (using the accessed data as an address) may be desirable. A pointer data transaction type may be determined if one of the address operands is also the destination of the instruction, for example. Additionally, an instruction set may include explicit "load address" instructions which are used to load an address into a register for subsequent use. For example, the x86 architecture defines the LES, LDS, etc., instructions.

Microprocessor 10 may be designed to assume that certain addressing modes (i.e. sets of address operands) imply a particular data type. These addressing modes may then be used by program developers when performing data accesses of the corresponding type. In this manner, program developers may achieve additional performance upon microprocessor 10 because microprocessor 10 uses a relatively optimal access mode for the various types of data accesses.

Alternatively, microprocessor 10 may be designed to search for "hint bits" added to the instruction encodings. "Hint bits" are bits defined within the instruction encoding in addition to the opcode and addressing mode identifiers. The hint bits can be used to explicitly encode into the instruction the access mode desired for the memory operations specified by the instruction. Using the addressing mode method described above is useful if using a pre-existing instruction set without defining new instruction encodings is desirable (e.g. for compatibility with previously developed code). However, hint bits which are orthogonal to the addressing modes of the instructions may be more desirable if modifying the instruction set is possible, since then the program developer/compiler may select the most desirable addressing mode for a memory operation and independently select the most desirable access mode (e.g. prefetch and caching characteristics).

In yet another alternative for embodiments of microprocessor 10 employing the x86 instruction set, redundant encodings of certain instructions may be used to specify access modes. Many instructions in the x86 instruction set have a one byte encoding in which the opcode and a source or destination register is specified, and a two byte encoding in which one byte specifies the opcode and the other byte specifies the source or destination. Execution of the one byte encoding and the equivalent two byte encoding is identical, and therefore one of the encodings is redundant. For example, the PUSH and POP instructions have one byte encodings and equivalent two byte encodings. The redundant encoding may be selected to specify a different access mode than the more commonly used encoding specifies.

Prefetch unit 26 is configured to perform prefetching in response to the access mode corresponding to a memory operation conveyed from load/store unit 20 to data cache 14. If the access mode indicates that prefetching is desired, prefetch unit 26 may use the address of the memory operation (or the data corresponding to the memory operation) to generate a prefetch address according to the prefetch algorithm indicated by the access mode. Prefetch unit 26 may convey the prefetch address to data cache 14 to check for a hit therein. If data cache 14 detects a miss, data cache 14 may forward the prefetch address to the main memory subsystem for fetching.

Instruction cache 12 is a high speed cache memory for storing instructions. It is noted that instruction cache 12 may be configured into a set-associative or direct mapped configuration. Instruction cache 12 may additionally include a branch prediction mechanism for predicting branch instructions as either taken or not taken. Instructions are fetched from instruction cache 12 and conveyed to decode unit 16 for decode and dispatch to a reservation station 17.

Decode unit 16 decodes each instruction fetched from instruction cache 12. Decode unit 16 dispatches the instruction to one or more of reservation stations 17 depending upon the type of instruction detected. More particularly, decode unit 16 produces a decoded instruction in response to each instruction fetched from instruction cache 12. The decoded instruction comprises control signals to be used by execute units 18 and/or load/store unit 20 to execute the instruction. For example, if a given instruction includes a memory operand, decode unit 16 may signal load/store unit 20 to perform a load/store (i.e. read/write) memory operation in response to the given instruction.

Decode unit 16 also detects the register operands used by the instruction and requests these operands from reorder buffer 22 and register file 24. In one embodiment, execute units 18 are symmetrical execution units. Symmetrical execution units are each configured to execute a particular subset of the instruction set employed by microprocessor 10. The subsets of the instruction set executed by each of the symmetrical execution units are the same. In another embodiment, execute units 18 are asymmetrical execution units configured to execute dissimilar instruction subsets. For example, execute units 18 may include a branch execute unit for executing branch instructions, one or more arithmetic/logic units for executing arithmetic and logical instructions, and one or more floating point units for executing floating point instructions. Decode unit 16 dispatches an instruction to a reservation station 17 which is coupled to an execute unit 18 or load/store unit 20 which is configured to execute that instruction.

Microcode unit 28 is included for handling instructions for which the architecturally defined operation is more complex than the hardware employed within execute units 18 and load/store unit 20 may handle. Microcode unit 28 parses the complex instruction into multiple instructions which execute units 18 and load/store unit 20 are capable of executing.

Load/store unit 20 provides an interface between execute units 18 and data cache 14. Load and store memory operations are performed by load/store unit 20 to data cache 14. Additionally, memory dependencies between load and store memory operations are detected and handled by load/store unit 20. Generally speaking, a "memory operation" is performed to transfer data between the main memory and microprocessor 10. A load memory operation specifies the transfer of data from one or more memory locations within the main memory to microprocessor 10. On the other hand, a store memory operation specifies the transfer of data from microprocessor 10 to one or more memory locations within the main memory. The memory location or locations accessed by a given memory operation are identified within the main memory by an address corresponding to the given memory operation. A memory operation may be an implicit part of an instruction which performs an operation upon a memory operand, or may be the explicit operation of an instruction (i.e. the instruction performs data movement only). When an instruction includes a memory operation, one or more of the operands of the instruction are used to generate the address of the memory operation. These operands are referred to as "address operands" and may be register operands as well as immediate/displacement data from the instruction encoding itself.

Reservation stations 17 are configured to store instructions whose operands have not yet been provided. An instruction is selected from those stored in a reservation station 17A–17C for execution if: (1) the operands of the instruction have been provided, and (2) the instructions within the reservation station 17A–17C which are prior to the instruction being selected in program order have not yet received operands. It is noted that a centralized reservation station may be included instead of separate reservations stations. The centralized reservation station is coupled between decode unit 16, execute units 18, and load/store unit 20. Such an embodiment may perform the dispatch function within the centralized reservation station.

Microprocessor 10 supports out of order execution, and employs reorder buffer 22 for storing execution results of speculatively executed instructions and storing these results into register file 24 in program order, for performing dependency checking and register renaming, and for providing for mispredicted branch and exception recovery. When an instruction is decoded by decode unit 16, requests for register operands are conveyed to reorder buffer 22 and register file 24. In response to the register operand requests, one of three values is transferred to the reservation station 17A–17C which receives the instruction: (1) the value stored in reorder buffer 22, if the value has been speculatively generated; (2) a tag identifying a location within reorder buffer 22 which will store the result, if the value has not been speculatively generated; or (3) the value stored in the register within register file 24, if no instructions within reorder buffer 22 modify the register. Additionally, a storage location within reorder buffer 22 is allocated for storing the results of the instruction being decoded by decode unit 16. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 18 or load/store unit 20 execute an instruction, the tag assigned to the instruction by reorder buffer 22 is conveyed upon result bus 30 along with the result of the instruction. Reorder buffer 22 stores the result in the indicated storage location. Additionally, reservation stations 17 compare the tags conveyed upon result bus 30 with tags of operands for instructions stored therein. If a match occurs, the unit captures the result from result bus 30 and stores it with the corresponding instruction. In this manner, an instruction may receive the operands it is intended to operate upon. Capturing results from result bus 30 for use by instructions is referred to as "result forwarding".

Instruction results are stored into register file 24 by reorder buffer 22 in program order. Storing the results of an instruction and deleting the instruction from reorder buffer 22 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 22 discards the instructions subsequent to the mispredicted branch instructions. Instructions thus discarded are also flushed from reservation stations 17, execute units 18, load/store unit 20, and decode unit 16.

Register file 24 includes storage locations for each register defined by the microprocessor architecture employed by microprocessor 10. For example, microprocessor 10 may employ the x86 microprocessor architecture. For such an embodiment, register file 24 includes locations for storing the EAX, EBX, ECX, EDX, ESI, EDI, ESP, and EBP register values.

Data cache 14 is a high speed cache memory configured to store data to be operated upon by microprocessor 10. It is noted that data cache 14 may be configured into a set-associative or direct-mapped configuration. Data cache 14 allocates and deallocates storage for data in cache lines. A cache line is a block of contiguous bytes. The byte within the cache line which has the lowest numerical address is stored at an address which is aligned to a cache line boundary.

The main memory subsystem effects communication between microprocessor 10 and devices coupled thereto. For example, instruction fetches which miss instruction cache 12 may be transferred from a main memory by the main memory subsystem. Similarly, data requests performed by load/store unit 20 which miss data cache 14 may be transferred from main memory by the main memory subsystem. Additionally, data cache 14 may discard a cache line of data which has been modified by microprocessor 10. The main memory subsystem transfers the modified line to the main memory.

It is noted that decode unit 16 may be configured to dispatch an instruction to more than one execution unit. For example, in embodiments of microprocessor 10 which employ the x86 microprocessor architecture, certain instructions may operate upon memory operands. Executing such an instruction involves transferring the memory operand from data cache 14, executing the instruction, and transferring the result to memory (if the destination operand is a memory location) or data cache 14. Load/store unit 20 performs the memory operations, and an execute unit 18 performs the execution of the instruction.

Figure 2:
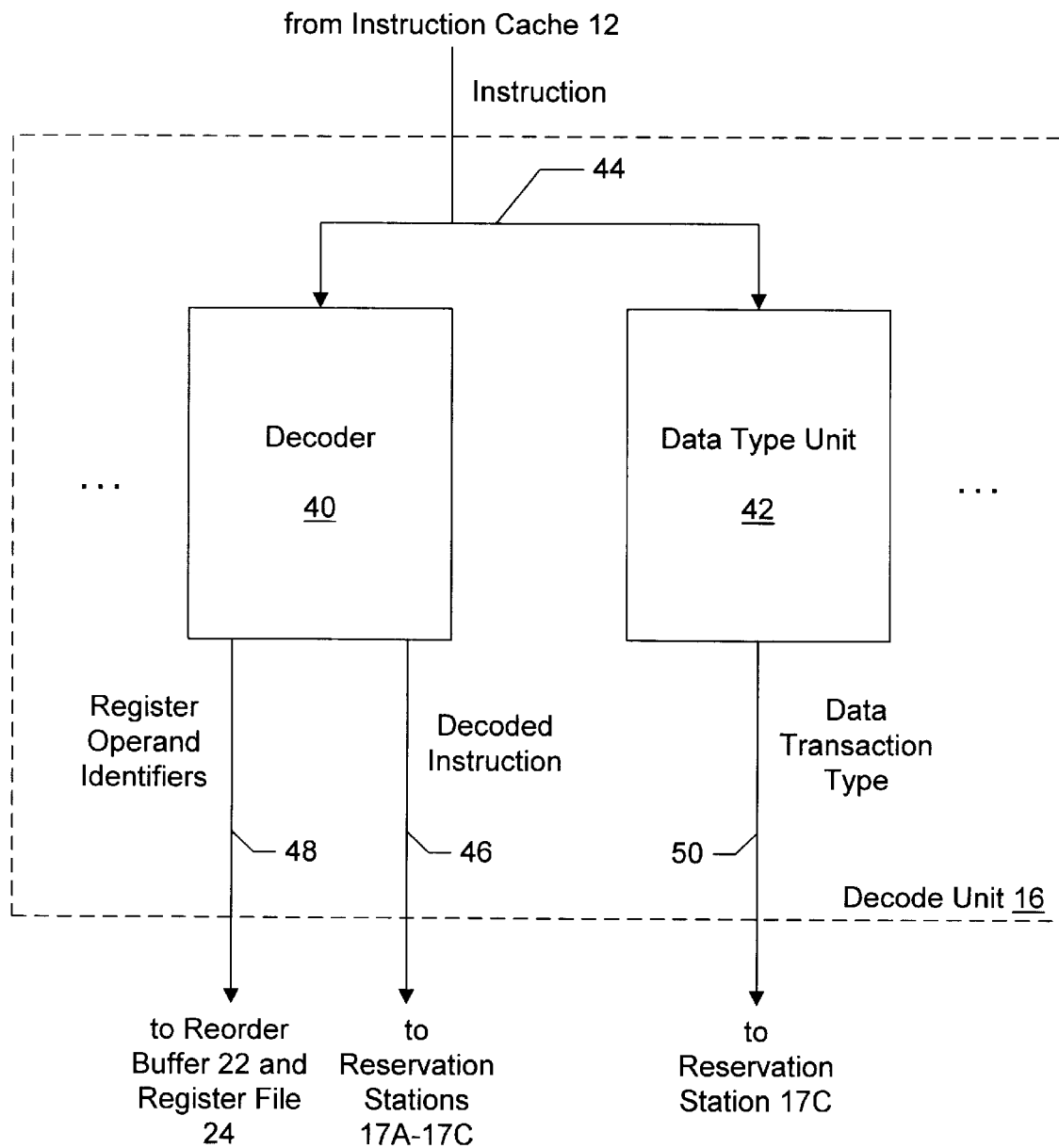
FIG. 2 is a block diagram of one embodiment of the decode unit shown in FIG. 1.

Turning now to FIG. 2, a block diagram of one embodiment of decode unit 16 is shown. Other embodiments are possible and contemplated. As shown in FIG. 2, decode unit 16 includes a decoder 40 and a data type unit 42. Decoder 40 and data type unit 42 are coupled to an instruction bus 44 from instruction cache 16. Additionally, decoder 40 is coupled to a decoded instruction bus 46 and a register operand identifiers bus 48. Decoded instruction bus 46 is coupled to reservation stations 17A–17C, while register operand identifiers bus 48 is coupled to reorder buffer 22 and register file 24. Data type unit 42 is coupled to a data transaction type bus 50 to reservation station 17C.

Decoder 40 receives an instruction from instruction bus 44 and decodes the instruction. Decoder 40 generates a corresponding decoded instruction and conveys the decoded instruction upon decoded instruction bus 46. Additionally, decoder 40 determines the register operands specified by the instruction (which may be address operands or register operands directly used by the instruction). Identifiers corresponding to the registers (i.e. register numbers) are conveyed to reorder buffer 22 and register file 24. Corresponding register operands are forwarded to reservation stations 17A–17C by reorder buffer 22/register file 24.

In parallel, data type unit 42 generates a data transaction type corresponding to the instruction. Data type unit 42 conveys the generated data transaction type to reservation station 17C on data transaction type bus 50. Since load/store unit 20 (connected to reservation station 17C) performs memory operations, reservation stations 17A–17B may not be coupled to data transaction type bus 50.

Additional decoders similar to decoder 40 and corresponding additional data type units similar to data type unit 42 may be included for concurrently decoding additional instructions. Furthermore, a dispatch control block (not shown) may be included for controlling which of reservation stations 17A–17C are to store each of the instructions decoded by decode unit 16 during a clock cycle. It is noted that data type unit 42 may be an integral part of decoder 40.

Figure 3:
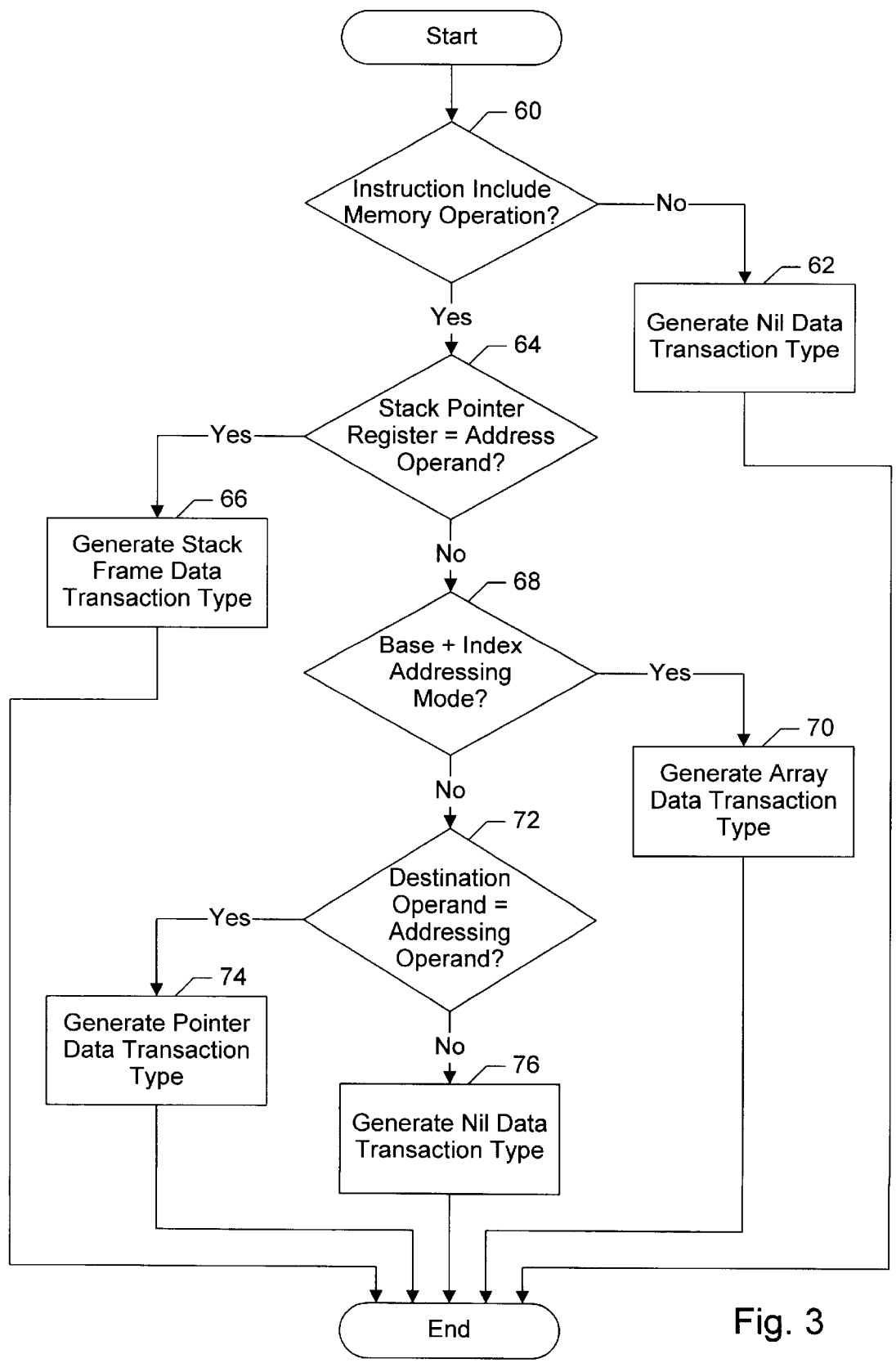
FIG. 3 is a flowchart illustrating activities performed by one embodiment of the decode unit shown in FIGS. 1 and/or 2.

Turning now to FIG. 3, a flowchart is shown illustrating operation of one embodiment of data type unit 42 as shown in FIG. 2. Other embodiments are possible and contemplated. For example, an embodiment employing hint bits or redundant instruction encodings to determine data transaction types is contemplated. While the steps are shown serially for ease of understanding, it is noted that any suitable ordering of the steps may be employed. Particularly, the steps may be parallelized in combinatorial logic within data type unit 42. The x86 architecture is used as an example below, but any architecture may be used.

Data type unit 42 determines if the instruction includes a memory operation (decision block 60). If the instruction does not include a memory operation, data type unit 42 generates a nil data transaction type (step 62). Because the instruction does not include a memory operation, load/store unit 20 ignores the corresponding data transaction type. Therefore, any transaction type may be generated for this case.

On the other hand, if the instruction does include a memory operation, data type unit 42 locates the address operands within the instruction. If one of the address operands is the stack pointer register (decision block 64), then data type unit 42 generates the stack frame data transaction type (step 66). It is noted that the stack pointer register may be architecturally defined as a stack pointer register, or may be a convention adopted by microprocessor 10. The x86 architecture is an example of an architecture having an architecturally defined stack pointer register (i.e. the ESP register). The EBP register may also be considered to be an architecturally defined stack pointer register, if desired. The ESP is architecturally defined as the stack pointer register in the sense that several instructions (such as PUSH and POP) use the ESP register as an implicit address operand. The ESP is updated by these instructions consistent with the corresponding stack manipulation. For the case of adopting a convention, microprocessor 10 assumes an otherwise general purpose register is a stack pointer register for purposes of data transaction type generation. Program developers/compiler developers are made aware of this assumption and may make use of the assumption by using the selected register as a stack pointer register. Using the register as a general purpose register would still operate correctly, but may not achieve data typing advantages.

If the address operands do not include the stack pointer register, data type unit 42 determines if a base plus index addressing mode is being used (decision block 68). If a base plus index addressing mode is detected, data type unit 42 generates the array transaction type (step 70). For example, in the x86 architecture, the presence of the scale-index-base (SIB) byte may indicate a base plus index addressing mode. Additionally, certain encodings of the register/memory (Mod R/M) byte may indicate a base plus index addressing mode.

Data type unit 42 also determines if the destination operand of the instruction is also one of the address operands (decision block 72). As mentioned above, an instruction encoded in this manner may be indicative that the data being read is a pointer. If such an encoded is detected, data type unit 42 generates the pointer data transaction type (step 74).

Finally, if the instruction includes a memory operand but decoding the instruction does not result in one of the other data transaction types, data type unit 42 generates the nil data transaction type (step 76). The nil data transaction type indicates that none of the data transaction types detected by data type unit 42 is indicated by the instruction encoding.

It is noted that, in cases in which more than one instruction encoding may indicate a particular data transaction type, it may be desirable to select one of the encodings for detection by data type unit 42. In other words, other possible instruction encodings would result in a nil data transaction type (or a different data transaction type). In this manner, program developers/compilers may specifically use the selected encoding to generate the corresponding data transaction type. If the corresponding data transaction type is not desired, other encodings may be used.

Figure 4:
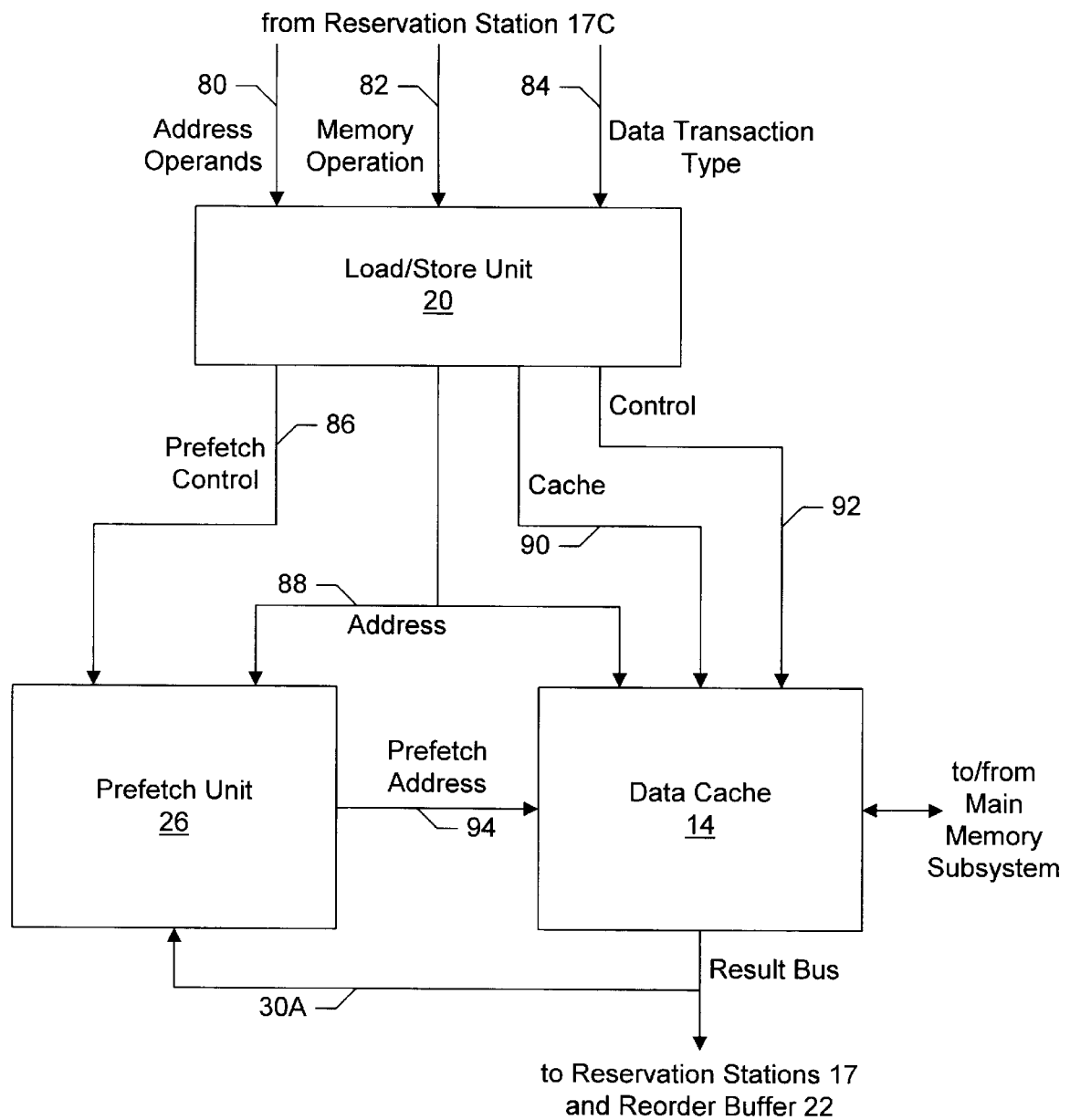
FIG. 4 is a block diagram of the load/store unit, the prefetch unit, and the data cache shown in FIG. 1, highlighting interconnection therebetween according to one embodiment of the units.

Turning next to FIG. 4, a block diagram illustrating one embodiment of interconnect between load/store unit 20, reservation station 17C, prefetch unit 26, and data cache 14 is shown. Other embodiments are possible and contemplated. An address operands bus 80, a memory operation bus 82, and a data transaction type bus 84 are coupled between load/store unit 20 and reservation station 17C. A prefetch control bus 86 and an address bus 88 are coupled between load/store unit 20 and prefetch unit 26. Address bus 88 is further coupled to data cache 14. Additionally, cache bus 90 and control bus 92 are coupled between load/store unit 20 and data cache 14. A prefetch address bus 94 and a result bus 30A (one of result buses 30) is coupled between prefetch unit 26 and data cache 14. Result bus 30A is also coupled to reservation stations 17 and reorder buffer 22, as described above.

Generally, reservation station 17C selects a memory operation for execution by load/store unit 20 once each address operand for that memory operation has arrived. The address operands for the memory operation are conveyed upon address operands bus 80, and an indication of the type of memory operation to be performed are conveyed upon memory operation bus 82. Additionally, the data transaction type conveyed to reservation station 17C from decode unit 16 when the corresponding memory operation was dispatched is conveyed upon data transaction type bus 84. It is noted that reservation station 17C may comprise a buffer or buffers for memory operations, and the buffer may be implemented within load/store unit 20, if desired.

In response to receiving the memory operation, load/store unit 20 generates the address of the memory operation using the address operands. Load/store unit 20 conveys the address to prefetch unit 26 and data cache 14 upon address bus 88. Additionally, load/store unit 20 uses the data transaction type to generate an access mode for the memory operation. For the embodiment of FIG. 4, the access mode includes a prefetching mode and a caching mode. The prefetching mode is conveyed as a prefetch control upon prefetch control bus 86 to prefetch unit 26, while the caching mode is conveyed upon cache bus 90. Additional cache control information (e.g. size of the operation in bytes, write through/writeback cache attributes, etc.) is conveyed upon control bus 92. Data cache 14 conveys the corresponding data and a hit/miss indication upon result bus 30A. Reservation stations 17 and/or reorder buffer 22 may be awaiting the data, and may capture the data from result bus 30A.

If the prefetch mode indicates that prefetching is desired, prefetch unit 26 may use the address from address bus 88 or the data from result bus 30A to generate one or more prefetch addresses. Prefetch unit 26 conveys the prefetch address(es) on prefetch address bus 94 to data cache 14. Data cache 14, if a miss is detected for the prefetch address (es), conveys the addresses to the main memory subsystem for fetching from main memory.

According to one embodiment, table 1 below indicates the prefetching mode for each of the data transaction types described above:

TABLE 1

| Prefetching modes | |
|---|---|
| Data Transaction Type | Prefetching Mode |
| nil | inhibited |
| stack frame | inhibited |
| array | streaming (or stride) |
| pointer | prefetch using data |

Since the nil data transaction type indicates that the memory operation is not encoded as one of the data transaction types supported by microprocessor 10, prefetching is inhibited for this data transaction type. Additionally, since stack frame references typically receive store memory operations prior to load memory operations to a given memory location, prefetching stack data may be undesirable. Therefore, prefetching may be inhibited for the stack frame data transaction type. The array data transaction type may employ a streaming or stride-based prefetch beginning with the address conveyed upon address bus 88. Finally, the pointer data transaction type may result in a prefetch using the data corresponding to the memory operation as a prefetch address.

It is noted that, for the x86 architecture, it is possible that the segment used when the pointer data is used as an address may differ from the segment used for the memory operation which fetches the data. However, the flat addressing mode (in which each of the segment bases is mapped to zero) is becoming more popular, reducing the risk of generating an incorrect fetch address.

Table 2 below illustrates the caching mode for each of the data type transactions described above:

TABLE 2

| Caching modes | |
|---|---|
| Data Transaction Type | Caching Mode |
| nil | normal |
| stack frame | write allocate |
| array | normal |
| pointer | inhibited |

Since the nil transaction type indicates that the memory operation is not encoded as one of the data transaction types supported by microprocessor 10, caching is allowed in the normal fashion of data cache 14. Stack frame data transaction types cause a high priority caching mode, including allocating a cache line if a store memory operation misses in data cache 14. Since stack frame data references may have a high probability of being reused, caching even in the case of store memory operation misses may be warranted. Array data transaction types lead to a normal caching mode, and pointer data transaction types lead to inhibited caching (since the likelihood of returning to a particular pointer may be lower). It is noted that cacheability is generally defined in the translation mechanism employed by microprocessor 10. The translation of addresses may be performed by data cache 14 via a TLB accessed in parallel, or may be performed in the main memory subsystem if data cache 14 is not physically addressed. If the translation mechanism indicates caching is inhibited for a given address, that indication may override the caching modes indicated above.

Figure 5:
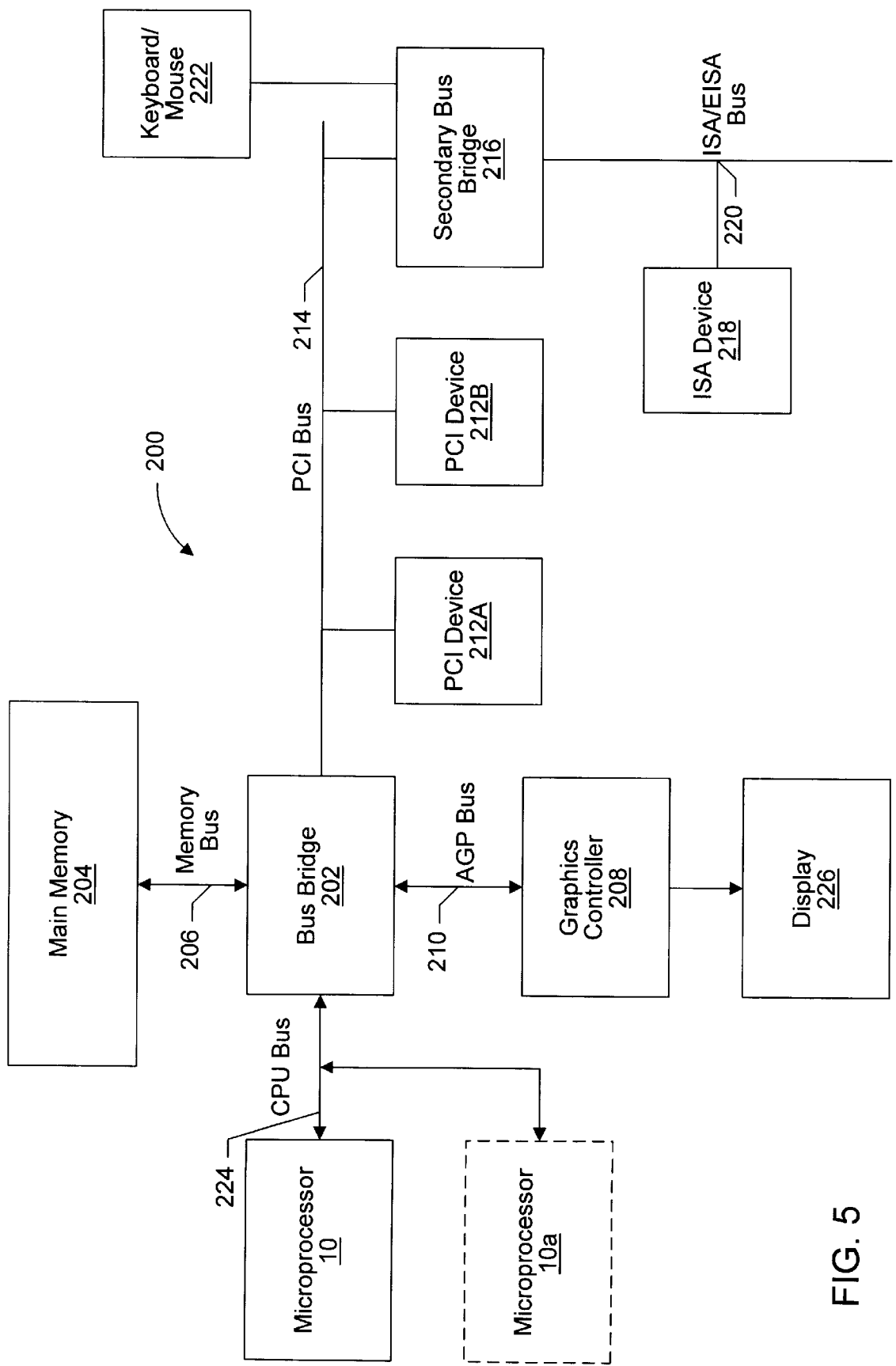
FIG. 5 is a block diagram of one embodiment of a computer system including the microprocessor shown in FIG. 1.

Turning now to FIG. 5, a block diagram of a computer system 200 including microprocessor 10 coupled to a variety of system components through a bus bridge 202 is shown. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Microprocessor 10 is coupled to bus bridge 202 through a CPU bus 224.

In addition to providing an interface to an ISA/EISA bus, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between microprocessor 10 and bus bridge 202 in other embodiments. Alternatively, the external cache may be coupled to bus bridge 202 and cache control logic for the external cache may be integrated.

Main memory 204 is a memory in which application programs are stored and from which microprocessor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bridge logic unit 102 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 302 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired.

In accordance with the above disclosure, a microprocessor has been shown which decodes an instruction to determine a data transaction type for the instruction. The data transaction type may be used to indicate an access mode for the memory operation corresponding to the instruction. The access mode may allow for more efficient use of caches and prefetching resources. The microprocessor may achieve higher performance due to the more efficient cache and prefetching.

Numerous variations and modifications will become apparent to those skilled in the art once the above disclosure is fully appreciated. It is intended that the following claims be interpreted to embrace all such variations and modifications.

What is claimed is:

1. A microprocessor comprising:
   a decode unit coupled to receive an instruction and configured to determine a first data transaction type corresponding to said instruction, wherein said first data transaction type is one of a plurality of data transaction types; and
   a load/store unit coupled to receive said first data transaction type if said instruction includes a memory operation, wherein said load/store unit is configured to determine an access mode for said memory operation in response to said first data transaction type, wherein said access mode comprises:
   (i) a cacheability mode indicating whether or not data corresponding to said memory operation is cacheable, wherein said cacheability mode indicates non-cacheable for at least one of said plurality of data transaction types; and
   (ii) a prefetch mode indicating a prefetch strategy corresponding to said memory operation.

2. The microprocessor as recited in claim 1, wherein said decode unit is configured to determine said first data transaction type responsive to a redundant encoding of said instruction.

3. The microprocessor as recited in claim 1, wherein said decode unit is configured to determine said first data transaction type responsive to hint bits of said instruction.

4. The microprocessor as recited in claim 1, wherein said decode unit is configured to determine said first data transaction type responsive to an addressing mode of said instruction.

5. The microprocessor as recited in claim 1 wherein said first data transaction type comprises a nil data transaction type.

6. The microprocessor as recited in claim 5 wherein said access mode comprises a default access mode.

7. The microprocessor as recited in claim 1 wherein said first data transaction type comprises a stack frame data transaction type indicating that said memory operation accesses a stack frame.

8. The microprocessor as recited in claim 7 wherein said cacheability mode indicates that data corresponding to said memory operation is cacheable.

9. The microprocessor as recited in claim 8 wherein said prefetch mode indicates inhibiting said microprocessor from prefetching in response to said memory operation.

10. The microprocessor as recited in claim 1 wherein said first data transaction type comprises an array data transaction type indicating that said memory operation is accessing an element of an array.

11. The microprocessor as recited in claim 10 wherein said cacheability mode indicates that data corresponding to said memory operation is cacheable.

12. The microprocessor as recited in claim 11 wherein said prefetch mode indicates that said microprocessor prefetch data consecutive to data accessed in response to said memory operation.

13. The microprocessor as recited in claim 1 wherein said first data transaction type comprises a pointer data transaction type indicating that said memory operation is a pointer access.

14. The microprocessor as recited in claim 13 wherein said access mode includes a non-cacheable indication indicating that data corresponding to said memory operation is non-cacheable.

15. The microprocessor as recited in claim 14 wherein said access mode further includes a prefetch indication that said data corresponding to said memory operation specifies a prefetch address.

16. A method for categorizing a memory operation comprising:
   decoding an instruction to determine a first data transaction type corresponding to said instruction, wherein said first data transaction type is one of a plurality of data transaction types; and
   accessing data corresponding to said instruction using an access mode responsive to said data transaction type, wherein said access mode comprises:
      (i) a cacheability mode indicating whether or not said data is cacheable, wherein said cacheability mode indicates non-cacheable for at least one of said plurality of data transaction types; and
      (ii) a prefetch mode indicating a prefetch strategy corresponding to said memory operation.

17. The method as recited in claim 16 wherein said first data transaction type comprises a stack frame data transaction type, and wherein said cacheability mode indicates cacheable, and wherein said prefetch mode indicates inhibited prefetching.

18. The method as recited in claim 16 wherein said first data transaction type comprises an array data transaction type, and wherein said cacheability mode indicates cacheable, and wherein said prefetch mode indicates prefetching of data consecutive to said data.

19. The method as recited in claim 16 wherein said first data transaction type comprises a nil data transaction type, and wherein said access mode comprises a default access mode.

20. The method as recited in claim 16, wherein said first data transaction type is specified by a redundant encoding of said instruction.

21. The method as recited in claim 16, wherein said first data transaction type is specified by hint bits of said instruction.

22. The method as recited in claim 16, wherein said first data transaction type is specified by an addressing mode of said instruction.

23. A microprocessor comprising:
   a decode unit coupled to receive an instruction and configured to determine a data transaction type corresponding to said instruction; and
   a load/store unit coupled to receive said data transaction type if said instruction includes a memory operation, wherein said load/store unit is configured to determine an access mode for said memory operation in response to said data transaction type, wherein said data transaction type comprises a pointer data transaction type indicating that said memory operation is a pointer access, wherein said access mode includes a non-cacheable indication indicating that data corresponding to said memory operation is non-cacheable.

24. The microprocessor as recited in claim 23 wherein said access mode further includes a prefetch indication that said data corresponding to said memory operation specifies a prefetch address.

25. A method for categorizing a memory operation comprising:
   decoding an instruction to determine a data transaction type corresponding to said instruction, wherein said data transaction type comprises a pointer data transaction type; and
   accessing data corresponding to said instruction using an access mode responsive to said data transaction type, wherein said access mode comprises:
      (i) a cacheability mode indicating whether or not said data is cacheable; and
      (ii) a prefetch mode indicating a prefetch strategy corresponding to said memory operation, and wherein said cacheability mode indicates non-cacheable, and wherein said prefetch mode indicates prefetching using said data as a prefetch address.

26. A computer system comprising:
   a microprocessor including:
      a decode unit coupled to receive an instruction and configured to determine a first data transaction type corresponding to said instruction, wherein said first data transaction type is one of a plurality of data transaction types;
      a load/store unit coupled to receive said first data transaction type if said instruction includes a memory operation, wherein said load/store unit is configured to determine an access mode for said memory operation in response to said first data transaction type, wherein said access mode comprises:
         (i) a cacheability mode indicating whether or not data corresponding to said memory operation is cacheable, wherein said cacheability indication indicates non-cacheable for at least one of said plurality of data transaction types; and
         (ii) a prefetch mode indicating a prefetch strategy corresponding to said memory operation; and
   an input/output (I/O) device configured to communicate between said computer system and another computer system to which said I/O device is capable of being coupled.

27. The computer system as recited in claim 26, wherein said input/output (I/O) device is a modem.

28. The computer system as recited in claim 26 further comprising an audio input/output (I/O) device.

* * * * *